(12) United States Patent
Gelon et al.

(10) Patent No.: US 6,207,315 B1
(45) Date of Patent: Mar. 27, 2001

(54) THREE DIMENSIONAL BATTERY FOR SPACE APPLICATIONS

(75) Inventors: Walter S. Gelon, Redwood City; John C. Hall, Saratoga, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/097,556

(22) Filed: Jun. 15, 1998

(51) Int. Cl.$^7$ ................................................. H01M 2/10

(52) U.S. Cl. ........................... 429/99; 429/120; 429/158; 429/186; 244/158 A (58) Field of Search ..................................... 429/186, 158, 429/120, 9, 99; 244/158 A (56) References Cited

U.S. PATENT DOCUMENTS

| | | | |
|---|---|---|---|
| 2,014,832 | * 9/1935 | Burgess . | |
| 4,346,151 | 8/1982 | Uba et al. | 429/54 |
| 4,420,545 | 12/1983 | Meyer et al. | 429/101 |
| 4,828,022 | 5/1989 | Koehler et al. | 165/185 |
| 4,840,855 | * 6/1989 | Foti et al. | 429/120 |
| 4,865,929 | * 9/1989 | Eck | 429/120 |
| 5,096,788 | 3/1992 | Bresin et al. | 429/99 |
| 5,310,141 | 5/1994 | Homer et al. | 244/158 |
| 5,510,208 | 4/1996 | Hall et al. | 429/164 |
| 5,634,612 | * 6/1997 | Faisant . | |
| 5,948,556 | * 9/1999 | Hau et al. . | |

FOREIGN PATENT DOCUMENTS

| | | |
|---|---|---|
| 0 449 511 A3 | 10/1991 | (EP) . |
| 0 512 906 A1 | 11/1992 | (EP) . |
| WO 89/00344 | 1/1989 | (WO) . |

OTHER PUBLICATIONS

Proceedings of the 24th Intersociety Energy Conversion Conference (vol. 3), Aug. 6–11, 1989 Washington, D.C., pp. 1375–1379.

A perspective view (undated but acknowledged as prior art) of a spacecraft obtained from the Internet, found at www.hughespace.com/images.cutaways/601_cutaway.gif (No Date).

(List continued on next page.)

*Primary Examiner*—John S. Maples
(74) *Attorney, Agent, or Firm*—Perman & Green, LLP (57) ABSTRACT

A spacecraft battery system arranges battery cells in two planes with a common mounting plate between them allowing for a more compact arrangement so the battery assembly can be removed from a limited mounting area resource of the spacecraft such as the north/south faces and placed remotely. Accordingly, a first battery assembly comprised of a plurality of battery cells in electrical continuity are mounted on and spread in a single plane over a first mounting surface of a planar mounting panel and a similarly constructed second battery assembly is mounted on and spread in a single plane over a second, opposed, mounting surface of that same planar mounting panel, the plane of the second battery assembly being spaced from the plane of the first battery assembly. The system includes a plurality of heat pipes embedded in the planar mounting panel and thermally connected with each of the battery cells for distributing heat uniformly across the planar mounting panel. The system also desirably includes a thermal radiator for radiating heat to deep space and heat conducting means thermally connecting the planar mounting panel to the thermal radiator means for drawing heat away from the planar mounting panel and to the thermal radiator means.

22 Claims, 6 Drawing Sheets-

OTHER PUBLICATIONS

B.D. Cox "Proceedings of the European Space Power Conference", Oct. 2–6, 1989, Madrid, Spain, Aug. 1989, ESA, Paris, France, Abstract, p. 194, Section 2.3, pp. 193–199.

21$^{st}$ IECEC8/1986, San Diego, CA, US vol. 3, pp. 1527–1530, ASC, US: M.J. Mackowski, "A Low Earth Orbit Nickel Hydrogen Battery Design", p. 1527, right hand col., second and third paragraphs, pp., 1528–1529, pp. Fig. 1.

Handbook of Thermal Design, Eric C. Guyer, Editor in Chief, McGraw–Hill Book Company, Chap. 4—"Heat Pipes", pp. 7–50 through 7–58, 1989. (No Month).

* cited by examiner

THREE DIMENSIONAL BATTERY FOR SPACE APPLICATIONS

BACKGROUND OF THE INVENTION

1. Field of the Invention

The present invention relates generally to spacecraft battery systems and, more particularly, to a technique resulting in a more compact arrangement of battery cells in a spacecraft.

2. Description of the Prior Art

Conventional two dimensional battery packaging methods need more spacecraft resources (mounting space, mass and heat pipes) to handle the increased number of battery cells required for higher power. Double stacking cells (arranging them three dimensionally as recommended in this disclosure) greatly reduces these resource demands. Present spacecraft place all battery cells in one plane (a two dimensional arrangement) on a panel which is directly mounted to a thermal radiator with embedded heat-pipes. Demands for greater eclipse power increase the number of cells so the two dimensional area devoted to batteries must also increase. Arranging battery cells in two planes with a common mounting plate between them allows for a more compact arrangement so the battery assembly can be removed from the spacecraft faces (a limited mounting area resource) and placed remotely.

Present spacecraft already use up all the north/south panel mounting area reserved for payload but conventional two dimensional batteries will require some of this area as payload power increases. The mounting area saved by three dimensionally arranged battery cells can now be devoted to adding payload Modern satellite geosynchronous satellite batteries comprise a series connection of cells (most commonly nickel hydrogen cells at the present time) and include a suitable construction for distributing heat within the battery and removing excess heat. The series connections and thermal subsystems are typically carried out by distributing the individual cells across a two dimensional planar surface.

It was with knowledge of the foregoing state of the technology that the present invention has been conceived and is now reduced to practice.

SUMMARY OF THE INVENTION

The present invention relates to a spacecraft battery system according to which battery cells are arranged in two planes with a common mounting plate between them allowing for a more compact arrangement. By so doing, the battery assembly can be removed from a limited mounting area resource of the spacecraft such as the north/south faces and placed remotely. To this end, a first cellular network comprised of a plurality of battery cells in electrical continuity are mounted on and spread in a single plane over a first mounting surface of a planar mounting panel and a similarly constructed second cellular network is mounted on and spread in a single plane over a second, opposed, mounting surface of that same planar mounting panel, the plane of the second cellular network being spaced from the plane of the first cellular network. The system includes a plurality of heat pipes embedded in the planar mounting panel and thermally connected with each of the battery cells for distributing heat uniformly across the planar mounting panel. The system also desirably includes a thermal radiator for radiating heat to deep space and heat conducting means thermally connecting the planar mounting panel to the thermal radiator means for drawing heat away from the planar mounting panel and to the thermal radiator means.

Figure 1:
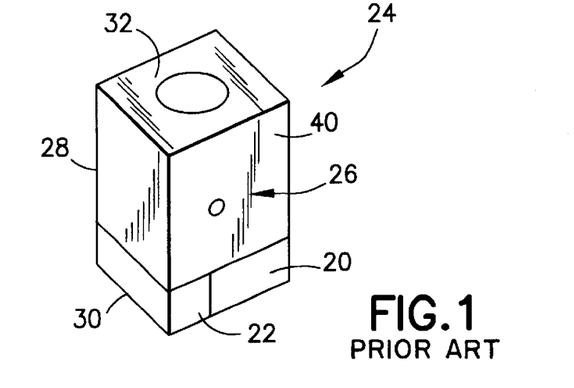
FIG. 1 is a diagrammatic perspective view of a satellite of known construction incorporating a battery assembly and a bus equipment assembly on a north or south face.

FIG. 1 illustrates a typical location of a battery assembly 20 adjoining a bus equipment assembly 22 for a spacecraft 24 (such as a geosynchronous spacecraft) where a pair of opposed faces are generally kept away from direct solar energy impingement. In a geosynchronous communications satellite, these faces are called the north and south faces 26, 28, respectively, and are the prime panel mounting areas and thermal radiators for the bus equipment, batteries and communications payload equipment. There is limited area for mounting all equipment directly onto these thermal radiator panels so if the batteries require more mounting area, then the communications payload equipment mounting area and or bus equipment mounting area must be reduced to compensate.

Figure 2:
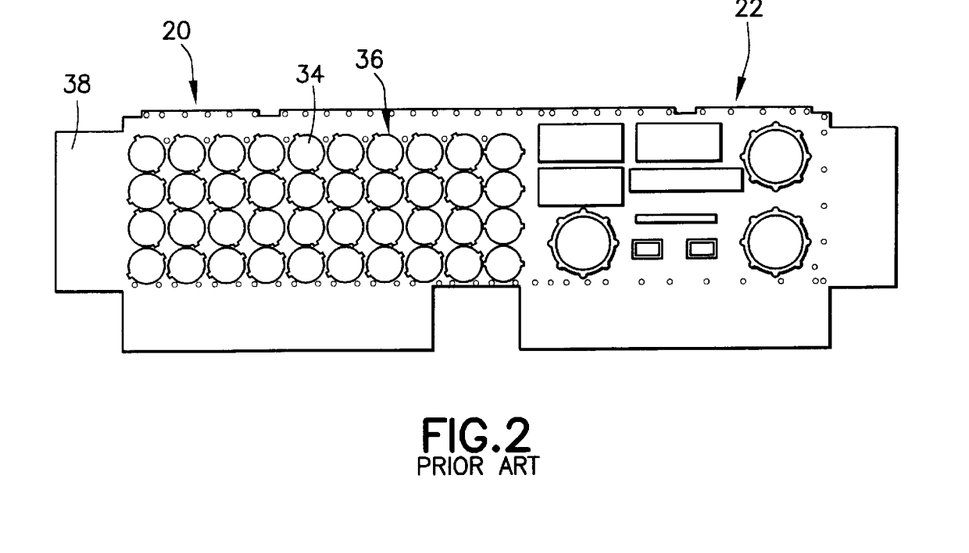
FIG. 2 is a plan view of the battery assembly and bus equipment assembly on the north or south face of the satellite illustrated in FIG. 1.

FIG. 2 illustrates a conventional battery technique, a two dimensional arrangement in which a plurality of battery cells 34 for a battery 36 mounted on a panel 38 are spread in a single plane over the prime battery panel mounting area. There may be embedded heat pipes (not shown) in this battery radiator panel which are used to isothermalize all the battery cells to produce a more efficient battery. In this instance, the battery assembly shares real estate with the bus equipment panel. However, higher power spacecraft of the future will require larger batteries which will result in more prime panel mounting area devoted to batteries and less to the equipment the customer really desires, such as the bus equipment.

Figure 3:
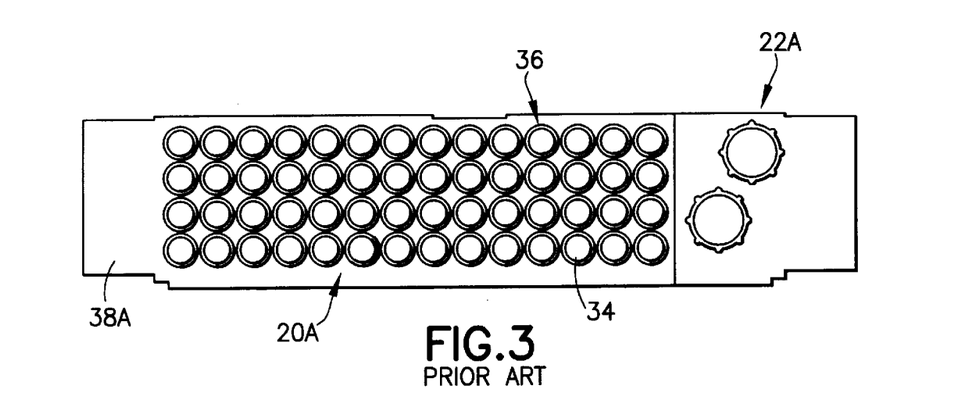
FIG. 3 is a plan view of the battery assembly and bus equipment assembly on the north or south face of a known advanced satellite with higher power requirements for eclipse.
Figure 4:
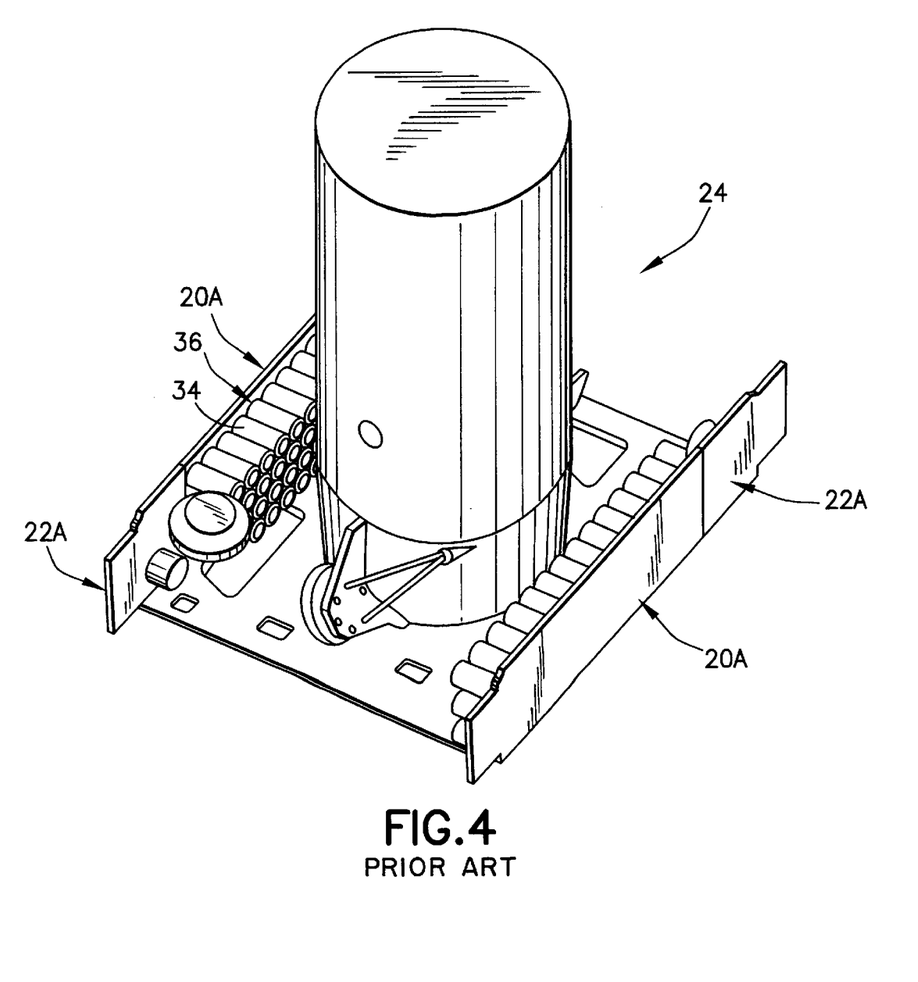
FIG. 4 is a perspective view of the advanced satellite of FIG. 3.
Figure 5:
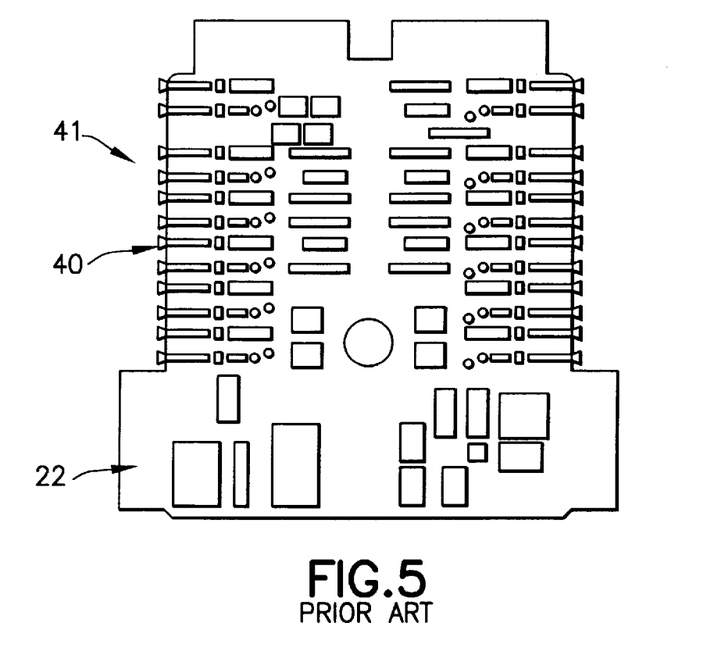
FIG. 5 is a plan view of a mounting panel of a known satellite illustrating the encroachment of the battery assembly and bus equipment assembly into payload mounting areas in order to support higher power requirements.

FIG. 3 illustrates a representative application of the single plane (two dimensional) technology to an advanced spacecraft with higher power requirements for eclipse, depicting a modified enlarged battery assembly 20A and a smaller bus equipment assembly 22A, for example. FIG. 4 illustrates a perspective view of a conventional battery mounting arrangement. FIGS. 3 and 4 illustrate that as the number of battery cells 34 increases, the prime panel mounting area devoted to batteries increases proportionately so that the battery assembly 20 impinges into areas previously reserved for the bus equipment assembly 22 which then must be transferred to the communications payload equipment panel mounting area 40 as seen in FIG. 5. The problem is that higher power is being sought so as to increase the payload capability of the spacecraft 41 but the negative result is a decrease in the prime area available for payload mounting below what is provided today.

One way to mitigate the loss of panel mounting area for higher power spacecraft is to develop battery cells with higher capacity but the same mounting footprint per cell. These larger cells can then yield the required higher total watt-hour capability while maintaining the same battery panel mounting area as a lower power spacecraft. However larger battery cell developments are costly and time consuming and entail program schedule risks. The simplest implementation of higher power is to increase the number of battery cells.

Figure 6:
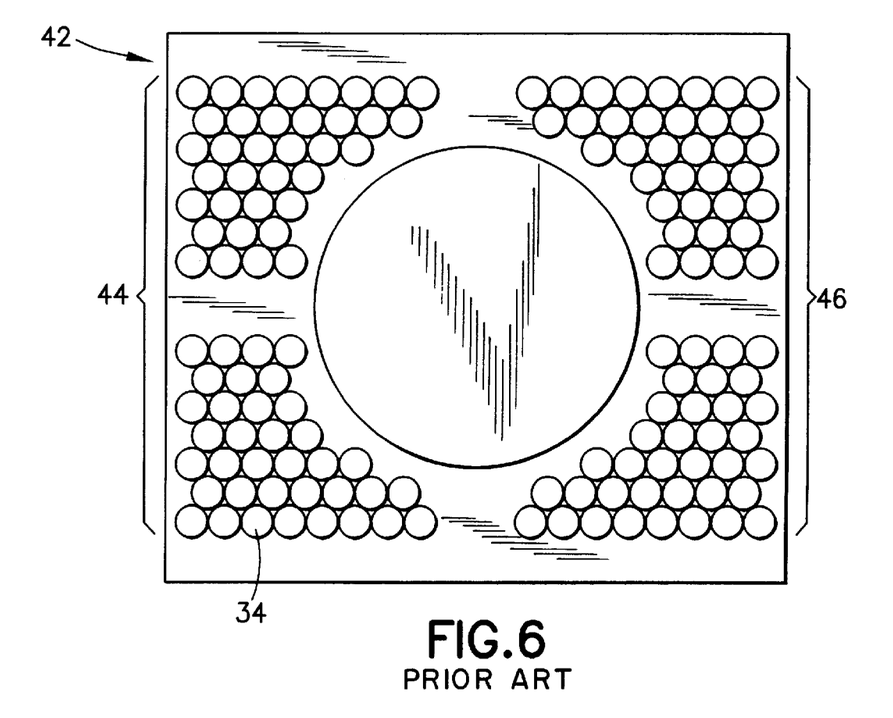
FIG. 6 is a plan view of a mounting panel of a known satellite illustrating the mounting area required for a large battery if the cells are spread into a single plane configuration.

Another way to maintain payload equipment mounting area is to move the single plane (two dimensional) of battery cells 34 internal to the spacecraft 42 as illustrated in FIG. 6. The problem with this implementation is that it occupies a substantial volume. It is very difficult to isothermalize (i.e., maintain isothermal conditions within) a battery spread over this large area and there are many possible leakage paths for heat to degrade the low temperature environment favored by the batteries. Also, since the batteries must have their own separate and unique temperature environment they must be heavily blanketed and blocked from viewing the very hot communications payload equipment. But effectively accomplishing this thermal isolation also blocks crossbody thermal radiation paths that are needed for cooling the propulsion fuel as well as all of the electronics for the spacecraft.

A three dimensional battery packaged in two or more planes of cells provides an effective means for decreasing the prime panel mounting area devoted to batteries and is the essence of this invention.

A primary feature, then, of the present invention is the provision of a technique resulting in a more compact arrangement of battery cells in a spacecraft.

Another feature of the present invention is the provision of a spacecraft battery in which the individual series connected cells are distributed in three as opposed to two dimensions resulting in a more compact battery design that consumes less mounting area on the spacecraft and thereby allows the spacecraft to carry additional equipment.

Still another feature of the present invention is the provision of such a spacecraft battery equipped with internal mounting planes which in turn contain heat pipes to distribute heat within the battery and to conduct heat from the battery.

Yet another feature of the present invention is the provision of such a spacecraft battery in which suitable connections are provided between the internal mounting planes and an external heat rejecting radiator.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 7:
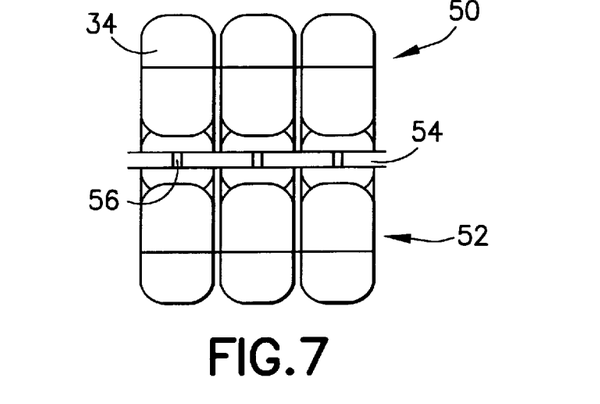
FIG. 7 is a side elevation view illustrating a battery mounting configuration embodying the invention.
Figure 8:
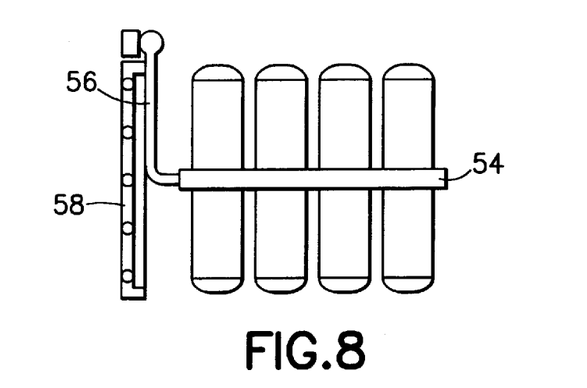
FIG. 8 is an end elevation view of the battery mounting configuration illustrated in FIG. 7.

Turn now to the drawings and, initially, to FIG. 7 which generally illustrates the arrangement of two cell planes, specifically, first and second battery assemblies 50, 52 with a common battery mounting panel 54 between them. This mounting panel 54 for both planes of cells 34 is the same and has embedded heat pipes 56 which simultaneously isothermalize both planes and are used to transport heat generated in the battery to a separate remote thermal radiator 58 as shown in a side view in FIG. 8. The resulting battery structure is not only more compact but it can be located away from its thermal radiator 58 to allow more choices for effective integration and more room for communications payload mounting. In addition, the battery assemblies 50, 52 require fewer expensive heat pipes 56 to attain the desired isothermal condition.

Figure 9:
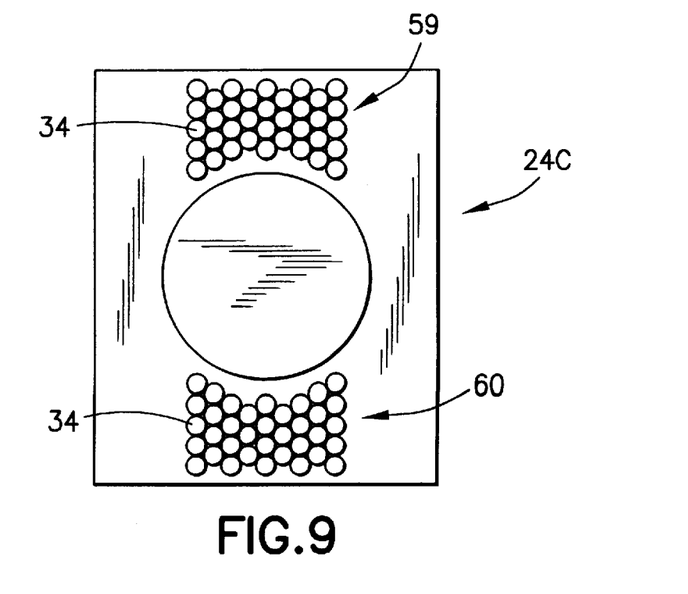
FIG. 9 is plan view of a three-dimensional two-plane battery mounting configuration having two separate packs constructed as four modules.
Figure 10:
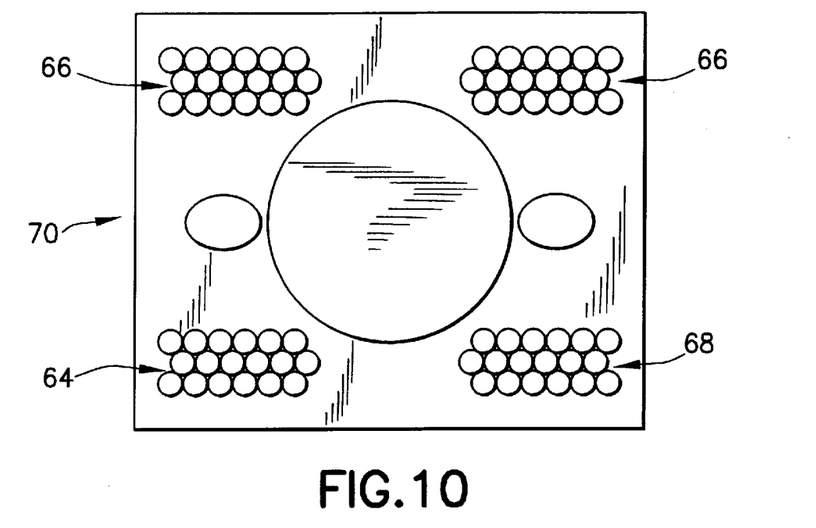
FIG. 10 is a plan view of an alternate three-dimensional configuration constructed as four packs and eight modules.

FIG. 6, discussed above, illustrates the magnitude of the mounting area required for a pair of large battery assemblies 44, 46 each comprised of 72 cells if they were spread in a single two dimensional plane. By way of contrast, FIG. 9 illustrates a pair 59, 60 of the same size battery assemblies and cells 34 with a three dimensional or two plane battery mounting implementation having two separate packs and built as four modules extending into the plane of the paper. This resulting three dimensional two plane battery pack in each instance has the obvious advantage of being more compact so it will be easier to handle and integrate. FIG. 10 illustrates an alternate three dimensional implementation built as four packs or assemblies 62, 64, 66, 68 and eight modules (four being unseen and into the plane of the paper) which will also yield flexibility in integration and location of a large battery on the spacecraft 70.

Figure 11:
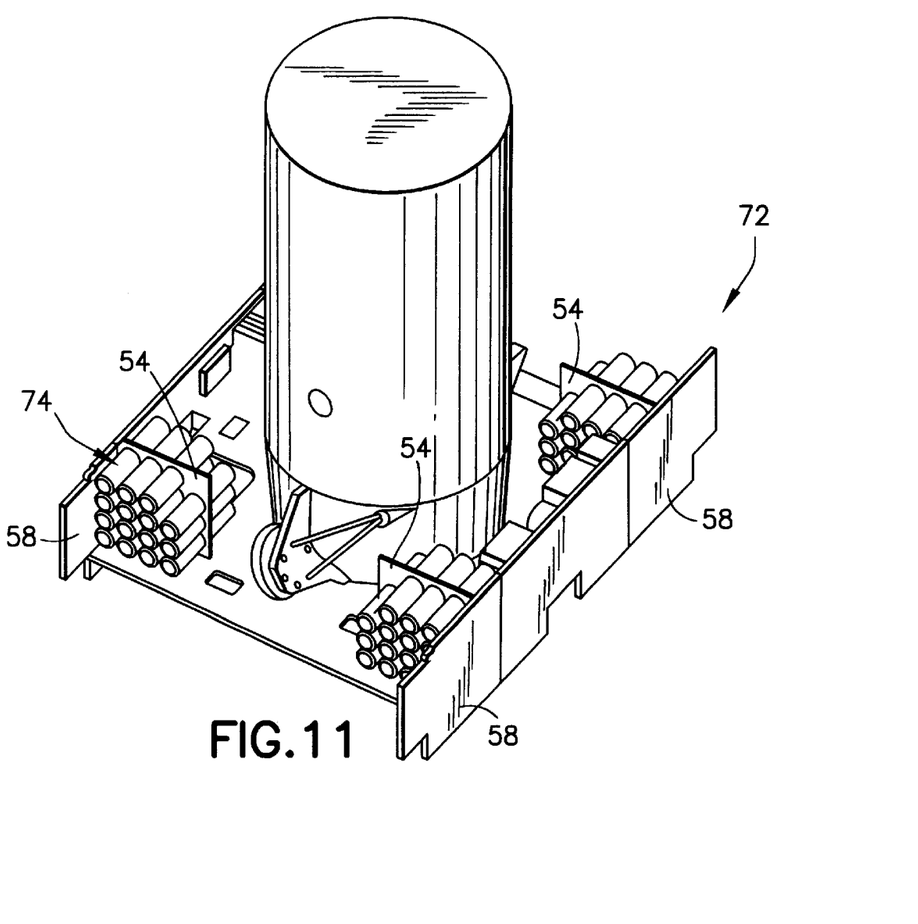
FIG. 11 is a perspective view of a three-dimensional two-plane battery constructed in four packs, with heat pipes connected to the north and south battery thermal radiators.

FIG. 11 illustrates a spacecraft 72 with a three dimensional two plane battery assembly 74, built in 4 packs, with heat pipes 56 (see FIGS. 7 and 8) in mounting panel 54 connected to north and south battery thermal radiators 58. This implementation allows the bus electronics equipment 80 to have the same mounting area available as in the lower power applications. There may be sore loss in battery capacity in this example because the battery thermal radiator area can be made smaller than the equivalent prime panel mounting area but this loss can be made up with the addition of a few more battery cells.

Figure 12:
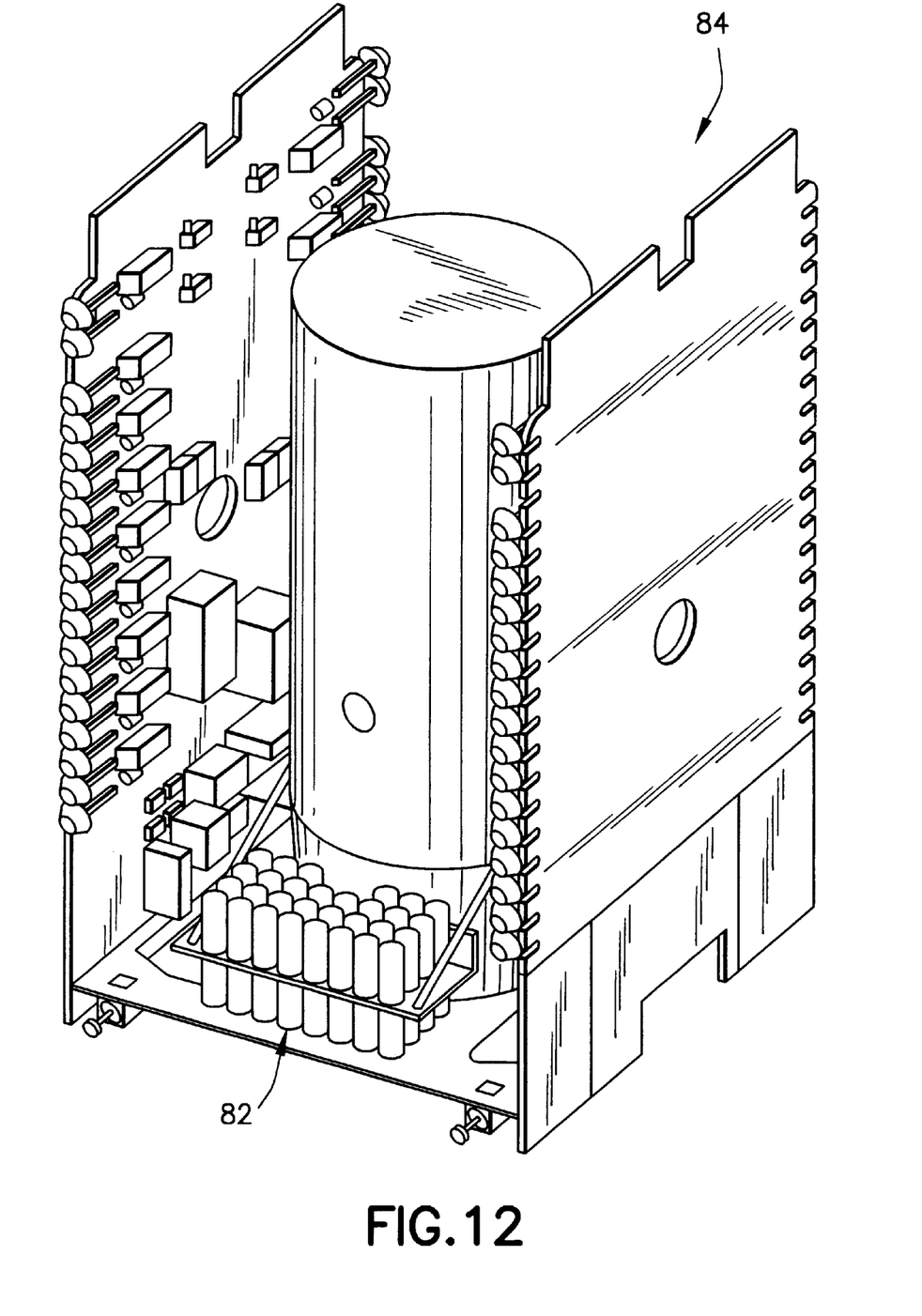
FIG. 12 is a perspective view of a three-dimensional two-plane battery designed for implementation as east and west batteries.

FIG. 12 illustrates a three dimensional two plane battery assembly 82 for a spacecraft 84 designed for east and west battery implementation of the type disclosed in commonly assigned U.S. Pat. No. 5,957,408, filed by applicants herein on Dec. 5, 1997 and entitled "Satellite With East and West Battery Radiators". This figure illustrates the compact nature of a large battery when packaged in three dimensions and requiring no resources from the prime north and south mounting and thermal radiator panels.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A spacecraft battery system comprising:
    a planar mounting panel having first and second opposed mounting surfaces;
    a first battery assembly including a plurality of battery cells having longitudinal axes and being in electrical continuity mounted on and extending away from said first mounting surface of said planar mounting panel, the longitudinal axes of the battery cells of the first battery assembly being transverse of said planar mounting panel and all of the battery cells of the first battery assembly being located completely on one side of the first mounting surface; and
    a second battery assembly including a plurality of battery cells having longitudinal axes and being in electrical continuity mounted on and extending away from said second mounting surface of said planar mounting panel, the longitudinal axes of the battery cells of the second battery assembly being transverse of said planar mounting panel and all of the battery cells of the second battery assembly being located completely on one side of the second mounting surface.

2. A spacecraft battery system as set forth in claim 1 including:
    isothermalizing means for distributing heat from said battery cells in each of said first and second battery assemblies uniformly across said planar mounting panel.

3. A spacecraft battery system as set forth in claim 2 wherein said isothermalizing means includes a plurality of heat pipes embedded in said planar mounting panel and thermally connected with said battery cells.

4. A spacecraft battery system as set forth in claim 1 including:
    thermal radiator means for radiating heat to deep space; and
    heat conducting means thermally connecting said planar mounting panel to said thermal radiator means for drawing heat away from said planar mounting panel and to said thermal radiator means.

5. A spacecraft battery system as set forth in claim 4 including:
    isothermalizing means for distributing heat from said battery cells in each of said first and second battery assemblies uniformly across said planar mounting panel.

6. A spacecraft battery system as set forth in claim 5 wherein said isothermalizing means includes a plurality of heat pipes embedded in said planar mounting panel and thermally connected with said battery cells.

7. A spacecraft battery system comprising:
    a first battery assembly including a plurality of battery cells having longitudinal axes and being in electrical continuity comprising a first battery assembly mounted on and extending away from a first mounting surface of a planar mounting panel having first and second opposed mounting surfaces, the longitudinal axes of the battery cells of the first battery assembly being transverse of said planar mounting panel and all of the battery cells of the first battery assembly being located completely on one side of the first mounting surface; and
    a second battery assembly including a plurality of battery cells having longitudinal axes and being in electrical continuity comprising a second battery assembly mounted on and extending transverse of and away from a second mounting surface of the planar mounting panel, the longitudinal axes of the battery cells of the second battery assembly being transverse of said planar mounting panel and all of the battery cells of the second battery assembly being located completely on one side of the second mounting surface.

8. A spacecraft battery system as set forth in claim 7 including:
    isothermalizing means for distributing heat from said battery cells in each of said first and second battery assemblies uniformly across the planar mounting panel.

9. A spacecraft battery system as set forth in claim 8 wherein said isothermalizing means includes a plurality of heat pipes embedded in the planar mounting panel, each of said heat pipes being associated with said battery cells.

10. A spacecraft battery system as set forth in claim 7 including:
    thermal radiator means for radiating heat to deep space; and
    heat conducting means thermally connecting said first and second battery assemblies to said thermal radiator means for drawing heat away from said battery cells and to said thermal radiator means.

11. A spacecraft battery system as set forth in claim 8 wherein said isothermalizing means includes a plurality of heat pipes embedded in said planar mounting panel and thermally connected with said battery cells.

12. A spacecraft battery system comprising:
    a planar mounting panel having first and second opposed mounting surfaces;
    a plurality of battery cells in electrical continuity comprising a first battery assembly mounted on and projecting away from said first mounting surface of said planar mounting panel, the longitudinal axes of the battery cells of the first battery assembly being transverse of said planar mounting panel and all of the battery cells of the first battery assembly being located completely on one side of the first mounting surface; and
    a plurality of battery cells in electrical continuity comprising a second battery assembly mounted on and projecting away from said second mounting surface of said planar mounting panel, the longitudinal axes of the battery cells of the second battery assembly being transverse of said planar mounting panel and all of the battery cells of the second battery assembly being located completely on one side of the second mounting surface.

13. A spacecraft battery system as set forth in claim 12 including:
    isothermalizing means for distributing heat from said battery cells in each of said first and second battery assemblies uniformly across said planar mounting panel.

14. A spacecraft battery system as set forth in claim 13 wherein said isothermalizing means includes a plurality of heat pipes embedded in said planar mounting panel and thermally connected with said battery cells.

15. A spacecraft battery system as set forth in claim 12 including:

thermal radiator means for radiating heat to deep space; and heat conducting means thermally connecting said planar mounting panel to said thermal radiator means for drawing heat away from said planar mounting panel and to said thermal radiator means.

16. A spacecraft battery system as set forth in claim 15 including:

isothermalizing means for distributing heat from said battery cells in each of said first and second battery assemblies uniformly across said planar mounting panel.

17. A spacecraft battery system as set forth in claim 16 wherein said isothermalizing means includes a plurality of heat pipes embedded in said planar mounting panel and thermally connected with said battery cells.

18. A spacecraft battery system comprising:

a plurality of battery cells having longitudinal axes and being in electrical continuity comprising a first battery assembly mounted on a first mounting surface of a planar mounting panel having first and second opposed mounting surfaces, the longitudinal axes of the battery cells of the first battery assembly being transverse of said mounting surfaces of said planar mounting panel and all of the battery cells of the first battery assembly being located completely on one side of the first mounting surface; and a plurality of battery cells having longitudinal axes and being in electrical continuity comprising a second battery assembly mounted on and projecting away from a second mounting surface of the planar mounting panel, the plane of said second battery assembly being spaced from the plane of said first battery assembly, the longitudinal axes of the battery cells of the second battery assembly being transverse of said mounting surfaces of said planar mounting panel and all of the battery cells of the second battery assembly being located completely on one side of the second mounting surface.

19. A spacecraft battery system as set forth in claim 18 including:

isothermalizing means for distributing heat from said battery cells in each of said first and second battery assemblies uniformly across the planar mounting panel.

20. A spacecraft battery system as set forth in claim 19 wherein said isothermalizing means includes a plurality of heat pipes embedded in the planar mounting panel, each of said heat pipes being associated with said battery cells.

21. A spacecraft battery system as set forth in claim 20 including:

thermal radiator means for radiating heat to deep space; and heat conducting means thermally connecting said first and second battery assemblies to said thermal radiator means for drawing heat away from said battery cells and to said thermal radiator means.

22. A spacecraft battery system as set forth in claim 19 wherein said isothermalizing means includes a plurality of heat pipes embedded in said planar mounting panel and thermally connected with said battery cells.

* * * * *